(12) United States Patent
Gupta et al.

(10) Patent No.: US 11,475,463 B2
(45) Date of Patent: Oct. 18, 2022

(54) SYSTEM, METHOD, AND COMPUTER PROGRAM PRODUCT FOR REAL-TIME PAYMENT GATEWAY EVENT MONITORING

(71) Applicant: Visa International Service Association, San Francisco, CA (US)

(72) Inventors: Anurag Gupta, Sammamish, WA (US); Jagadeesh Saravanan, Bellevue, WA (US); Richa Singh, Kirkland, WA (US)

(73) Assignee: Visa International Service Association, San Francisco, CA (US)

( * ) Notice: Subject to any disclaimer, the term of this patent is extended or adjusted under 35 U.S.C. 154(b) by 242 days.

(21) Appl. No.: 16/993,558

(22) Filed: Aug. 14, 2020

(65) Prior Publication Data

US 2021/0049616 A1 Feb. 18, 2021

Related U.S. Application Data

(60) Provisional application No. 62/887,891, filed on Aug. 16, 2019.

(51) Int. Cl.
*G06Q 20/02* (2012.01)
*G06Q 30/00* (2012.01)
*H04L 67/02* (2022.01)
*G06F 16/955* (2019.01)
*G06Q 20/20* (2012.01)

(52) U.S. Cl.
CPC ..... *G06Q 30/0185* (2013.01); *G06F 16/9566* (2019.01); *G06Q 20/027* (2013.01); *G06Q 20/202* (2013.01); *H04L 67/02* (2013.01)

(58) Field of Classification Search
None
See application file for complete search history.

(56) References Cited

U.S. PATENT DOCUMENTS

2015/0347989 A1* 12/2015 Kumar S ............. G06Q 20/027
705/44

* cited by examiner

Primary Examiner — Paul Danneman
(74) Attorney, Agent, or Firm — The Webb Law Firm

(57) ABSTRACT

Described are a system, method, and computer program product for real-time payment gateway event monitoring. The method includes receiving input data from a merchant system including an application URL associated with a merchant control interface having a web socket programmed and/or configured to persistently listen for HTTP POST messages, and an event of a payment gateway system. The method also includes monitoring ongoing events of the payment gateway system associated with ongoing transaction messages communicated from point-of-sale (POS) devices to the payment gateway system and detecting the event in the ongoing events. The method further includes, in response to detection of the event, generating a HTTP POST message including event data of the event, and communicating the HTTP POST message to the application URL to cause the merchant control interface to display the event data in a chart for visual representation of the event data.

20 Claims, 3 Drawing Sheets

SYSTEM, METHOD, AND COMPUTER PROGRAM PRODUCT FOR REAL-TIME PAYMENT GATEWAY EVENT MONITORING

CROSS-REFERENCE TO RELATED APPLICATIONS

This application claims priority to U.S. Provisional Patent Application No. 62/887,891 filed on Aug. 16, 2019, the disclosure of which is incorporated by reference herein in its entirety.

BACKGROUND

1. Technical Field

Disclosed embodiments or aspects relate generally to electronic payment processing systems and, in one particular embodiment or aspect, to a system, method, and computer program product for real-time payment gateway event monitoring.

2. Technical Considerations

Merchants may communicate with one or more systems once a user has initiated a transaction (e.g., via a point-of-sale device, a webpage, and/or the like) to process the transaction. For system interactions that generate data notifications, there may be inefficiencies for merchant systems to constantly monitor for notification updates from other servers. In particular, payment gateway events need to be timely detected by a merchant system, but persistent data checks can be wasteful for system power and memory.

Therefore, there is a need in the art for systems, methods, and computer program products that reduce the amount of communications between computing devices and/or systems when detecting one or more events associated with a transaction. Moreover, there is a need in the art for a technical solution to reduce the power and memory requirements for merchant detection of payment gateway events.

SUMMARY

Accordingly and generally, provided is an improved system, method, and computer program product for real-time payment gateway event monitoring. The method includes receiving input data from a merchant system including an application URL associated with a merchant control interface having a web socket programmed and/or configured to persistently listen for HTTP POST messages, and an event of a payment gateway system. The method also includes monitoring ongoing events of the payment gateway system associated with ongoing transaction messages communicated from point-of-sale (POS) devices to the payment gateway system and detecting the event in the ongoing events. The method further includes, in response to detection of the event, generating a HTTP POST message including event data of the event, and communicating the HTTP POST message to the application URL to cause the merchant control interface to display the event data in a chart for visual representation of the event data.

According to non-limiting embodiments or aspects, provided is a computer-implemented method for real-time payment gateway event monitoring. The method includes receiving, with at least one processor, input data from a merchant system including: (i) an application URL associated with a merchant control interface having a web socket programmed and/or configured to persistently listen for HTTP POST messages, and (ii) an identifier of at least one event of a payment gateway system, the at least one event predetermined to trigger notifications to the merchant control interface. The method also includes monitoring, with at least one processor, ongoing events of the payment gateway system associated with ongoing transaction messages communicated from at least one point-of-sale (POS) device to the payment gateway system. The method further includes detecting, with at least one processor, the at least one event in the ongoing events. The method further includes, in response to detection of the at least one event, generating, with at least one processor, at least one HTTP POST message including event data of the at least one event, and communicating, with at least one processor, the at least one HTTP POST message to the application URL to cause the merchant control interface to display the event data in at least one chart for visual representation of the event data.

In further non-limiting embodiments or aspects, the method may include generating a notification routing table based on the input data. The notification routing table may include a plurality of application URLs each associated with one or more events. The at least one HTTP POST message may be generated based on the notification routing table and communicated to the application URL based on an association of the application URL with the identifier of the at least one event in the notification routing table.

In further non-limiting embodiments or aspects, the at least one event may include at least one recurring event. The method may include continually monitoring, with at least one processor, the ongoing events to generate a plurality of HTTP POST messages triggered from the at least one recurring event. Each HTTP POST message of the plurality of HTTP POST messages may be associated with an instance of the at least one recurring event. The method may further include storing, with at least one processor in a database, additional event data associated with the plurality of HTTP POST messages triggered from the at least one recurring event. The method may further include generating, with at least one processor, display data configured to cause the merchant control interface to display searchable records including the additional event data.

In further non-limiting embodiments or aspects, the ongoing events may include authorization request messages, the at least one event may include detection of a fraudulent authorization request message, and the at least one HTTP POST message may include a categorization of the at least one event as fraudulent. The HTTP POST message may be further configured to cause the merchant system to execute a fraud mitigation process.

In further non-limiting embodiments or aspects, the at least one HTTP POST message may be generated and communicated to the application URL immediately after detection of the at least one event. The at least one HTTP POST message may be further configured to cause the web socket of the merchant control interface to generate a message to the at least one POS device identifying the at least one event immediately after detecting the HTTP POST message.

According to non-limiting embodiments or aspects, provided is a system for real-time payment gateway event monitoring. The system includes at least one server computer including at least one processor. The at least one server computer is programmed and/or configured to receive input data from a merchant system including: (i) an application URL associated with a merchant control interface having a web socket programmed and/or configured to persistently listen for HTTP POST messages, and (ii) an identifier of at least one event of a payment gateway system, the at least one event predetermined to trigger notifications to the merchant control interface. The at least one server computer is also programmed and/or configured to monitor ongoing events of the payment gateway system associated with ongoing transaction messages communicated from at least one point-of-sale (POS) device to the payment gateway system. The at least one server computer is further programmed and/or configured to detect the at least one event in the ongoing events. The at least one server computer is further programmed and/or configured to, in response to detection of the at least one event, generate at least one HTTP POST message including event data of the at least one event. The at least one server computer is further programmed and/or configured to, in response to detection of the at least one event, communicate the at least one HTTP POST message to the application URL to cause the merchant control interface to display the event data in at least one chart for visual representation of the event data.

In further non-limiting embodiments or aspects, the at least one server computer may be further programmed and/or configured to generate a notification routing table based on the input data. The notification routing table may include a plurality of application URLs each associated with one or more events. The at least one HTTP POST message may be generated based on the notification routing table and communicated to the application URL based on an association of the application URL with the identifier of the at least one event in the notification routing table.

In further non-limiting embodiments or aspects, wherein the at least one event may include at least one recurring event. The at least one server computer may be further programmed and/or configured to continually monitor the ongoing events to generate a plurality of HTTP POST messages triggered from the at least one recurring event. Each HTTP POST message of the plurality of HTTP POST messages may be associated with an instance of the at least one recurring event. The at least one server computer may be further programmed and/or configured to store additional event data associated with the plurality of HTTP POST messages triggered from the at least one recurring event. The at least one server computer may be further programmed and/or configured to generate display data configured to cause the merchant control interface to display searchable records including the additional event data.

In further non-limiting embodiments or aspects, the ongoing events may include authorization request messages. The at least one event may include detection of a fraudulent authorization request message. The at least one HTTP POST message may include a categorization of the at least one event as fraudulent. The HTTP POST message may be further configured to cause the merchant system to execute a fraud mitigation process.

In further non-limiting embodiments or aspects, the at least one HTTP POST message may be generated and communicated to the application URL immediately after detection of the at least one event. The at least one HTTP POST message may be further configured to cause the web socket of the merchant control interface to generate a message to the at least one POS device identifying the at least one event immediately after detecting the HTTP POST message.

According to non-limiting embodiments or aspects, provided is a computer program product for real-time payment gateway event monitoring. The computer program product includes at least one non-transitory computer-readable medium including program instructions that, when executed by at least one processor, cause the at least one processor to receive input data from a merchant system. The input data includes: (i) an application URL associated with a merchant control interface having a web socket programmed and/or configured to persistently listen for HTTP POST messages, and (ii) an identifier of at least one event of a payment gateway system, the at least one event predetermined to trigger notifications to the merchant control interface. The program instructions further cause the at least one processor to monitor ongoing events of the payment gateway system associated with ongoing transaction messages communicated from at least one point-of-sale (POS) device to the payment gateway system. The program instructions further cause the at least one processor to detect the at least one event in the ongoing events. The program instructions further cause the at least one processor to, in response to detection of the at least one event, generate at least one HTTP POST message including event data of the at least one event. The program instructions further cause the at least one processor to, in response to detection of the at least one event, communicate the at least one HTTP POST message to the application URL to cause the merchant control interface to display the event data in at least one chart for visual representation of the event data.

In further non-limiting embodiments or aspects, the program instructions may further cause the at least one processor to generate a notification routing table based on the input data. The notification routing table may include a plurality of application URLs each associated with one or more events. The at least one HTTP POST message may be generated based on the notification routing table and communicated to the application URL based on an association of the application URL with the identifier of the at least one event in the notification routing table.

In further non-limiting embodiments or aspects, the at least one event may include at least one recurring event. The program instructions may further cause the at least one processor to continually monitor the ongoing events to generate a plurality of HTTP POST messages triggered from the at least one recurring event. Each HTTP POST message of the plurality of HTTP POST messages may be associated with an instance of the at least one recurring event. The program instructions may further cause the at least one processor to store additional event data associated with the plurality of HTTP POST messages triggered from the at least one recurring event. The program instructions may further cause the at least one processor to generate display data configured to cause the merchant control interface to display searchable records including the additional event data.

In further non-limiting embodiments or aspects, the ongoing events may include authorization request messages, the at least one event may include detection of a fraudulent authorization request message, and the at least one HTTP POST message may include a categorization of the at least one event as fraudulent. The HTTP POST message may be further configured to cause the merchant system to execute a fraud mitigation process.

In further non-limiting embodiments or aspects, the at least one HTTP POST message may be generated and communicated to the application URL immediately after detection of the at least one event. The at least one HTTP POST message may be further configured to cause the web socket of the merchant control interface to generate a message to the at least one POS device identifying the at least one event immediately after detecting the HTTP POST message.

According to non-limiting embodiments or aspects, provided is a computer-implemented method for real-time payment gateway event monitoring. The method includes receiving, with at least one processor, input data from a merchant system including: (i) an application URL associated with a merchant control interface in communication with a merchant database, and (ii) an identifier of at least one event of a payment gateway system. The at least one event is predetermined to trigger notifications to the merchant control interface. The method also includes monitoring, with at least one processor, ongoing events of the payment gateway system associated with ongoing transactions communicated from at least one point-of-sale (POS) device to the payment gateway system. The method further includes detecting, with at least one processor, the at least one event in the ongoing events. The method further includes, in response to detection of the at least one event, generating, with at least one processor, at least one webhook including event data of the at least one event. The method further includes, in response to detection of the at least one event, communicating, with at least one processor, the at least one webhook to the application URL configured to cause the merchant control interface to display the event data in at least one chart for visual representation of the event data.

According to non-limiting embodiments or aspects, provided is a computer-implemented method for real-time payment gateway event monitoring. The method includes generating, with at least one processor, a notification routing table based on input data from at least one merchant system. The input data includes: (i) a plurality of application URLs, each associated with a merchant control interface having a web socket programmed and/or configured to persistently listen for HTTP POST messages, and (ii) a plurality of identifiers of events of a payment gateway system, each associated with and predetermined to trigger notifications to at least one of the plurality of application URLs. The method further includes monitoring, with at least one processor, ongoing events of the payment gateway system associated with ongoing transaction messages communicated from at least one point-of-sale (POS) device of the at least one merchant system to the payment gateway system. The method further includes detecting, with at least one processor, at least one event of the plurality of events in the ongoing events. The method further includes, in response to detection of the at least one event, generating, with at least one processor, at least one HTTP POST message based on the notification routing table including event data of the at least one event. The method further includes communicating, with at least one processor, the at least one HTTP POST message to the at least one application URL of the plurality of application URLs associated with at least one identifier of at least one event in the notification routing table, the at least one HTTP POST message configured to cause at least one merchant control interface associated with the at least one application URL to display the event data in at least one chart for visual representation of the event data.

Other non-limiting embodiments or aspects of the present disclosure will be set forth in the following numbered clauses:

Clause 1: A computer-implemented method comprising: receiving, with at least one processor, input data from a merchant system comprising (i) an application URL associated with a merchant control interface having a web socket programmed and/or configured to persistently listen for HTTP POST messages, and (ii) an identifier of at least one event of a payment gateway system, the at least one event predetermined to trigger notifications to the merchant control interface; monitoring, with at least one processor, ongoing events of the payment gateway system associated with ongoing transaction messages communicated from at least one point-of-sale (POS) device to the payment gateway system; detecting, with at least one processor, the at least one event in the ongoing events; and, in response to detection of the at least one event: generating, with at least one processor, at least one HTTP POST message comprising event data of the at least one event; and communicating, with at least one processor, the at least one HTTP POST message to the application URL to cause the merchant control interface to display the event data in at least one chart for visual representation of the event data.

Clause 2: The computer-implemented method of clause 1, further comprising generating a notification routing table based on the input data, the notification routing table comprising a plurality of application URLs each associated with one or more events, wherein the at least one HTTP POST message is generated based on the notification routing table and communicated to the application URL based on an association of the application URL with the identifier of the at least one event in the notification routing table.

Clause 3: The computer-implemented method of clause 1 or 2, wherein the at least one event comprises at least one recurring event, the method further comprising continually monitoring, with at least one processor, the application URL for a plurality of HTTP POST messages triggered from the at least one recurring event.

Clause 4: The computer-implemented method of any of clauses 1-3, further comprising: storing, with at least one processor in a database, additional event data associated with the plurality of HTTP POST messages triggered from the at least one recurring event; and generating, with at least one processor, display data configured to cause the merchant control interface to display searchable records comprising the additional event data.

Clause 5: The computer-implemented method of any of clauses 1-4, wherein the ongoing events comprise authorization request messages, the at least one event comprises detection of a fraudulent authorization request message, and the at least one HTTP POST message comprises a categorization of the at least one event as fraudulent, the HTTP POST message further configured to cause the merchant system to execute a fraud mitigation process.

Clause 6: The computer-implemented method of any of clauses 1-5, wherein the at least one HTTP POST message is generated and communicated to the application URL immediately after detection of the at least one event.

Clause 7: The computer-implemented method of any of clauses 1-6, wherein the at least one HTTP POST message is further configured to cause the web socket of the merchant control interface to generate a message to the at least one POS device identifying the at least one event immediately after detecting the HTTP POST message.

Clause 8: A system comprising at least one server computer including at least one processor, the at least one server computer programmed and/or configured to: receive input data from a merchant system comprising (i) an application URL associated with a merchant control interface having a web socket programmed and/or configured to persistently listen for HTTP POST messages, and (ii) an identifier of at least one event of a payment gateway system, the at least one event predetermined to trigger notifications to the merchant control interface; monitor ongoing events of the payment gateway system associated with ongoing transaction messages communicated from at least one point-of-sale (POS) device to the payment gateway system; detect the at least one event in the ongoing events; and, in response to detection of the at least one event: generate at least one HTTP POST message comprising event data of the at least one event; and communicate the at least one HTTP POST message to the application URL to cause the merchant control interface to display the event data in at least one chart for visual representation of the event data.

Clause 9: The system of clause 8, wherein the at least one server computer is further programmed and/or configured to generate a notification routing table based on the input data, the notification routing table comprising a plurality of application URLs each associated with one or more events, wherein the at least one HTTP POST message is generated based on the notification routing table and communicated to the application URL based on an association of the application URL with the identifier of the at least one event in the notification routing table.

Clause 10: The system of clause 8 or 9, wherein the at least one event comprises at least one recurring event, wherein the at least one server computer is further programmed and/or configured to continually monitor the application URL for a plurality of HTTP POST messages triggered from the at least one recurring event.

Clause 11: The system of any of clauses 8-10, wherein the at least one server computer is further programmed and/or configured to: store additional event data associated with the plurality of HTTP POST messages triggered from the at least one recurring event; and generate display data configured to cause the merchant control interface to display searchable records comprising the additional event data.

Clause 12: The system of any of clauses 8-11, wherein the ongoing events comprise authorization request messages, the at least one event comprises detection of a fraudulent authorization request message, and the at least one HTTP POST message comprises a categorization of the at least one event as fraudulent, the HTTP POST message further configured to cause the merchant system to execute a fraud mitigation process.

Clause 13: The system of any of clauses 8-12, wherein the at least one HTTP POST message is generated and communicated to the application URL immediately after detection of the at least one event.

Clause 14: The system of any of clauses 8-13, wherein the at least one HTTP POST message is further configured to cause the web socket of the merchant control interface to generate a message to the at least one POS device identifying the at least one event immediately after detecting the HTTP POST message.

Clause 15: A computer program product comprising at least one non-transitory computer-readable medium including program instructions that, when executed by at least one processor, cause the at least one processor to: receive input data from a merchant system comprising (i) an application URL associated with a merchant control interface having a web socket programmed and/or configured to persistently listen for HTTP POST messages, and (ii) an identifier of at least one event of a payment gateway system, the at least one event predetermined to trigger notifications to the merchant control interface; monitor ongoing events of the payment gateway system associated with ongoing transaction messages communicated from at least one point-of-sale (POS) device to the payment gateway system; detect the at least one event in the ongoing events; and, in response to detection of the at least one event: generate at least one HTTP POST message comprising event data of the at least one event; and communicate the at least one HTTP POST message to the application URL to cause the merchant control interface to display the event data in at least one chart for visual representation of the event data.

Clause 16: The computer program product of clause 15, wherein the program instructions further cause the at least one processor to generate a notification routing table based on the input data, the notification routing table comprising a plurality of application URLs each associated with one or more events, wherein the at least one HTTP POST message is generated based on the notification routing table and communicated to the application URL based on an association of the application URL with the identifier of the at least one event in the notification routing table.

Clause 17: The computer program product of clause 15 or 16, wherein the at least one event comprises at least one recurring event, wherein the program instructions further cause the at least one processor to continually monitor the application URL for a plurality of HTTP POST messages triggered from the at least one recurring event.

Clause 18: The computer program product of any of clauses 15-17, wherein the program instructions further cause the at least one processor to: store additional event data associated with the plurality of HTTP POST messages triggered from the at least one recurring event; and generate display data configured to cause the merchant control interface to display searchable records comprising the additional event data.

Clause 19: The computer program product of any of clauses 15-18, wherein the ongoing events comprise authorization request messages, the at least one event comprises detection of a fraudulent authorization request message, and the at least one HTTP POST message comprises a categorization of the at least one event as fraudulent, the HTTP POST message further configured to cause the merchant system to execute a fraud mitigation process.

Clause 20: The computer program product of any of clauses 15-19, wherein the at least one HTTP POST message is generated and communicated to the application URL immediately after detection of the at least one event, and wherein the at least one HTTP POST message is further configured to cause the web socket of the merchant control interface to generate a message to the at least one POS device identifying the at least one event immediately after detecting the HTTP POST message.

Clause 21: A computer-implemented method comprising: receiving, with at least one processor, input data from a merchant system comprising (i) an application URL associated with a merchant control interface in communication with a merchant database, and (ii) an identifier of at least one event of a payment gateway system, the at least one event predetermined to trigger notifications to the merchant control interface; monitoring, with at least one processor, ongoing events of the payment gateway system associated with ongoing transactions communicated from at least one point-of-sale (POS) device to the payment gateway system; detecting, with at least one processor, the at least one event in the ongoing events; and, in response to detection of the at least one event: generating, with at least one processor, at least one webhook comprising event data of the at least one event; and communicating, with at least one processor, the at least one webhook to the application URL configured to cause the merchant control interface to display the event data in at least one chart for visual representation of the event data.

Clause 22: A computer-implemented method comprising: generating, with at least one processor, a notification routing table based on input data from at least one merchant system, the input data comprising (i) a plurality of application URLs, each associated with a merchant control interface having a web socket programmed and/or configured to persistently listen for HTTP POST messages, and (ii) a plurality of identifiers of events of a payment gateway system, each associated with and predetermined to trigger notifications to at least one of the plurality of application URLs; monitoring, with at least one processor, ongoing events of the payment gateway system associated with ongoing transaction messages communicated from at least one point-of-sale (POS) device of the at least one merchant system to the payment gateway system; detecting, with at least one processor, at least one event of the plurality of events in the ongoing events; and, in response to detection of the at least one event: generating, with at least one processor, at least one HTTP POST message based on the notification routing table comprising event data of the at least one event; and communicating, with at least one processor, the at least one HTTP POST message to at least one application URL of the plurality of application URLs associated with at least one identifier of at least one event in the notification routing table, the at least one HTTP POST message configured to cause at least one merchant control interface associated with the at least one application URL to display the event data in at least one chart for visual representation of the event data.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
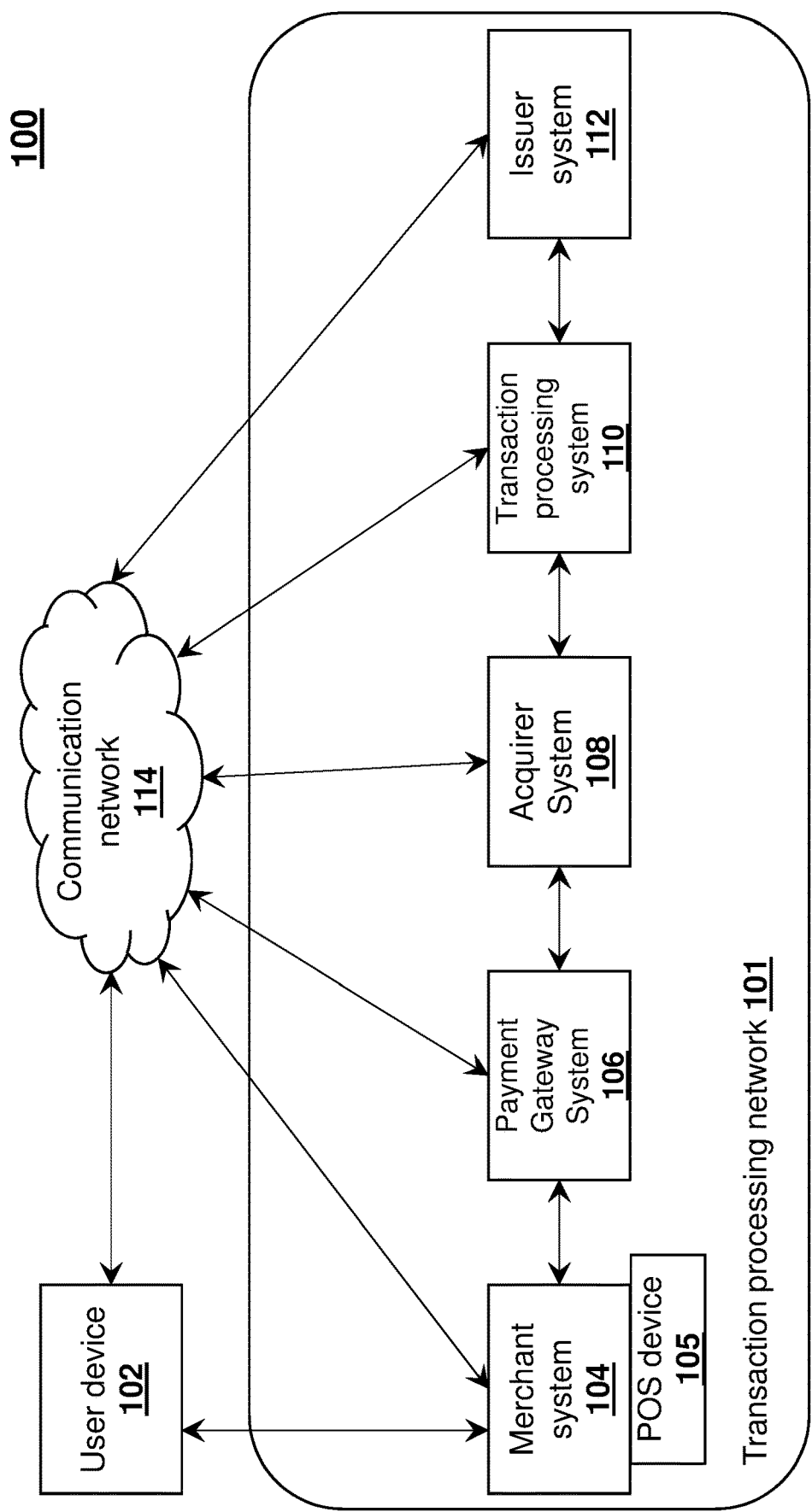
FIG. 1 is a schematic diagram of one embodiment or aspect of a system and method for real-time payment gateway event monitoring.

For purposes of the description hereinafter, the terms "upper", "lower", "right", "left", "vertical", "horizontal", "top", "bottom", "lateral", "longitudinal," and derivatives thereof shall relate to non-limiting embodiments as they are oriented in the drawing figures. However, it is to be understood that non-limiting embodiments may assume various alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX), etc.), and/or the like. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "graphical user interface" (GUI) refers to a generated display, such as one or more displays with which a user may interact, either directly or indirectly (e.g., through a keyboard, mouse, touchscreen, etc.).

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications, a token service executing one or more software applications, and/or the like. A transaction processing server may include one or more processors and, in some non-limiting embodiments, may be operated by or on behalf of a transaction service provider.

As used herein, the term "issuer institution" and/or "issuing bank" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment device, and/or may be electronic and used for electronic payments. The term "issuer system" refers to one or more computing devices operated by or on behalf of an issuer institution, such as a server computer executing one or more software applications. For example, an issuer system may include one or more authorization servers for authorizing a transaction.

As used herein, the term "acquirer institution" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a bank. As used herein, the term "acquirer system" may refer to one or more computer systems, computing devices, software applications, and/or the like operated by or on behalf of an acquirer institution.

As used herein, the terms "authenticating system" and "authentication system" may refer to one or more computing devices that authenticate a user and/or an account, such as but not limited to a transaction processing system, merchant system, issuer system, payment gateway, a third-party authenticating service, and/or the like.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computing devices, servers, groups of servers, and/or the like operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to systems, methods, and computer program products for monitoring payment gateway events in real-time. Described embodiments and aspects improve upon existing solutions by reducing delay, both in detecting when an event occurs by monitoring at the payment gateway system and transmitting data based on (e.g., in response to) detecting the event at the payment gateway system. In this way, communications between a payment gateway system and a merchant system may be reduced, since the communication between the payment gateway system and the merchant system may be direct, and delays in detecting events and communicating based on detection of such events may occur at and/or within a single system. Furthermore, described embodiments and aspects reduce computer resources (e.g., processing capacity and bandwidth) required to implement an event monitoring scheme, by pushing event notifications from a payment gateway system to merchants in response to event detection, rather than requiring merchants to persistently request updates from the payment gateway system.

Referring now to FIG. 1, FIG. 1 is a diagram of an example environment 100 in which devices, systems, methods, and/or products described herein, may be implemented. As shown in FIG. 1, environment 100 includes user device 102, merchant system 104, payment gateway system 106, acquirer system 108, transaction processing system 110, and/or issuer system 112. User device 102, merchant system 104, payment gateway system 106, acquirer system 108, transaction processing system 110, and/or issuer system 112 may interconnect (e.g., establish a connection to communicate) via wired connections, wireless connections, or a combination of wired and wireless connections.

User device 102 may include one or more computing devices capable of being in communication with merchant system 104, payment gateway system 106, acquirer system 108, transaction processing system 110, and/or issuer system 112 via communication network 114. For example, user device 102 may include one or more computing devices such as one or more mobile devices, one or more smartphones, one or more wearable devices (e.g., watches, glasses, lenses, clothing, and/or the like). In some non-limiting embodiments or aspects, user device 102 may be capable of communicating via a short-range wireless communication connection (e.g., a wireless communication connection for communicating information in a range between 2 to 3 centimeters to 5 to 6 meters, such as an NFC communication connection, an RFID communication connection, a Bluetooth® communication connection, and/or the like). In some non-limiting embodiments or aspects, user device 102 may be associated with a user as described herein.

Merchant system 104 may include one or more computing devices capable of being in communication with user device 102, payment gateway system 106, acquirer system 108, transaction processing system 110, and/or issuer system 112. For example, merchant system 104 may include one or more computing devices, such as one or more mobile devices, one or more smartphones, one or more wearable devices, one or more POS devices 105, one or more servers, one or more databases (e.g., one or more merchant databases associated with a merchant), and/or the like. In some non-limiting embodiments or aspects, merchant system 104 may communicate via a short-range wireless communication connection. In some non-limiting embodiments, merchant system 104 may be associated with a merchant, as described herein. Merchant system 104 may include one or more databases for storing event data received in hypertext transfer protocol (HTTP) POST messages from a payment gateway system 106. Merchant system 104 may include a server configured with a web socket (e.g., a persistent communicative connection between a web application and a server, such as implemented by the WebSocket computer communications protocol) to monitor an application uniform resource locator (URL) for network communications, including HTTP POST messages. The application URL identifies a network location that hosts one or more services of a merchant system (e.g., of a web application), such as transaction monitoring, fraud monitoring, and/or the like. The application URL may be associated with a merchant control interface (e.g., a user interface executed on a computing device for display of data and including one or more input and output components), such that messages communicated to the application URL are provided, at least in part, to the merchant control interface for display (e.g., before or after processing by the merchant system). For example, data from received HTTP POST messages may be displayed in the merchant control interface.

Payment gateway system 106 may include one or more computing devices capable of being in communication with user device 102, merchant system 104, acquirer system 108, transaction processing system 110, and/or issuer system 112 via communication network 114. For example, payment gateway system 106 may include a server, a group of servers, and/or other like computing devices. In some non-limiting embodiments or aspects, payment gateway system 106 may be associated with a payment gateway as described herein. Payment gateway system 106 may include one or more databases for storing event data generated in HTTP POST messages.

Acquirer system 108 may include one or more computing devices capable of being in communication with user device 102, merchant system 104, payment gateway system 106, transaction processing system 110, and/or issuer system 112 via communication network 114. For example, acquirer system 108 may include one or more computing devices, such as a server, a group of servers, and/or other like computing devices. In some non-limiting embodiments, acquirer system 108 may be associated with an acquirer as described herein.

Transaction processing system 110 may include one or more computing devices capable of being in communication with user device 102, merchant system 104, payment gateway system 106, acquirer system 108, and/or issuer system 112 via communication network 114. For example, transaction processing system 110 may include one or more computing devices, such as a server, a group of servers, and/or other like computing devices. In some non-limiting embodiments, transaction processing system 110 may be associated with a transaction service provider as described herein.

Issuer system 112 may include one or more computing devices capable of being in communication with user device 102, merchant system 104, payment gateway system 106, acquirer system 108, and/or transaction processing system 110 via communication network 114. For example, issuer system 112 may include one or more computing devices, such as a server, a group of servers, and/or other like computing devices. In some non-limiting embodiments, issuer system 112 may be associated with an issuer institution that issued a payment account and/or instrument (e.g., a credit account, a debit account, a credit card, a debit card, and/or the like) to a customer.

In some non-limiting embodiments or aspects, transaction processing network 101 may include a plurality of systems in a communication path for processing a transaction. For example, transaction processing network 101 may include merchant system 104, payment gateway system 106, acquirer system 108, transaction processing system 110, and/or issuer system 112 in a communication path (e.g., a communication path, a communication channel, a communication network, and/or the like) for processing an electronic payment transaction. As an example, transaction processing network 101 can process (e.g., initiate, conduct, authorize, and/or the like) an electronic payment transaction via the communication path between merchant system 104, payment gateway system 106, acquirer system 108, transaction processing system 110, and/or issuer system 112.

Communication network 114 may include one or more wired and/or wireless networks. For example, communication network 114 may include a cellular network (e.g., a long-term evolution (LTE) network, a third generation (3G) network, a fourth generation (4G) network, a fifth generation (5G) network a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks shown in FIG. 1 are provided as an example. There can be additional systems, devices, and/or networks, fewer systems, devices, and/or networks, different systems, devices, and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally, or alternatively, a set of systems or a set of devices (e.g., one or more systems, one or more devices) of environment 100 can perform one or more functions described as being performed by another set of systems or another set of devices of environment 100.

In some non-limiting embodiments or aspects, transaction data may include transaction parameters associated with transactions, such as payment transactions initiated and/or conducted with a payment device (e.g., such as an electronic wallet application and/or the like). Non-limiting examples of transaction parameters include: electronic wallet card data associated with an electronic card (e.g., an electronic credit card, an electronic debit card, an electronic loyalty card, and/or the like), decision data associated with a decision (e.g., a decision to approve or deny a transaction authorization request), authorization data associated with an authorization response (e.g., an approved spending limit, an approved transaction value, and/or the like), a PAN and/or other account identifier, an authorization code (e.g., a PIN, etc.), data associated with a transaction value (e.g., an approved limit, a transaction value, etc.), data associated with a transaction date and time, data associated with a conversion rate of a currency, data associated with a merchant type (e.g., goods, grocery, fuel, and/or the like), data associated with an acquiring institution country, data associated with an identifier of a country associated with the PAN, data associated with a response code, data associated with a merchant identifier (e.g., a merchant name, a merchant location, and/or the like), data associated with a type of currency corresponding to funds stored in association with the PAN, and/or the like.

In some non-limiting embodiments or aspects, payment gateway system 106 may provide a portal for the merchant to provide input. In such an example, the portal may be configured to receive as input the application URL and/or an indication associated with selection of one or more events to be monitored from among a plurality of events (e.g., a plurality of events displayed via a drop-down menu, a list, and/or the like) at the payment gateway system 106.

In some non-limiting embodiments or aspects, merchant system 104 associated with the merchant may communicate data to payment gateway system 106, such as data input to a merchant control interface. For example, the input may include an application URL and/or an identifier of at least one event. Merchant system 104 may communicate input to cause payment gateway system 106 to monitor at least one reoccurring event and, upon detection of the at least one recurring event, trigger (e.g., automatically cause) the communication of notifications to a merchant control interface associated with the application URL and the merchant database. The merchant control interface may be displayed on a computing device of the merchant system 104 and/or the payment gateway system 106, and may include one or more application programing interfaces (APIs) for communicating data to other computing devices in the environment 100. For example, merchant system 104 may communicate (e.g., transmit) the input to payment gateway system 106 based on receiving the input from the merchant at merchant system 104, where the merchant is viewing a GUI of the portal (e.g., via an output component of merchant system 104). In such an example, the merchant may provide input to the portal via merchant system 104, the input including the application URL and/or the indication associated with the selection of the one or more events to be monitored at the payment gateway system 106, the one or more events selected from among the plurality of events.

In non-limiting embodiments or aspects, the merchant control interface of merchant system 104 may display the event data where the event data includes at least one chart for visualization of the event data. In such an example, the merchant control interface may invoke one or more charting libraries (e.g., D3, GoogleCharts®, and/or the like) to plot charts including the event data.

The transaction service provider system 110 may provide a server-side web application for receiving HTTP POST messages. A merchant system 104 may use the web application as a plug-in to their service platform, such that the web application is modular and usable without additional coding for integration with the merchant system. The merchant control interface may display an area for live event monitoring (e.g., a live event chart, a notification monitor, etc.) that may be filterable to arrange notifications by event type. The merchant interface may be programmed or configured to display transaction data, such as transaction value, refund amount, number of customers created, number of fraudulent transactions, and/or the like.

Figure 2:
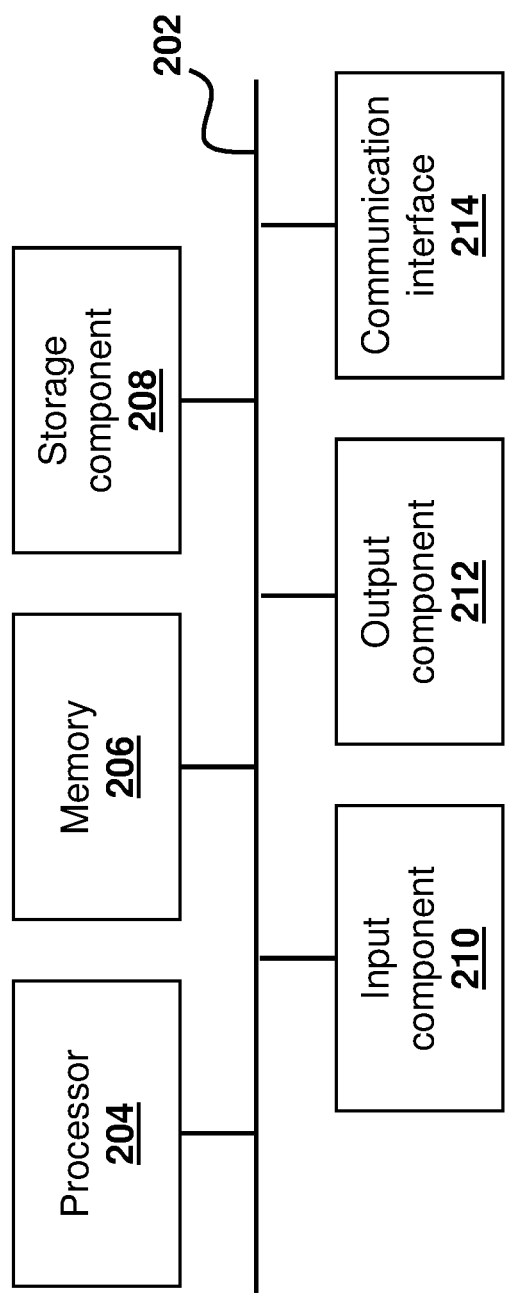
FIG. 2 is a schematic diagram of one embodiment or aspect of a system and method for real-time payment gateway event monitoring.

Referring now to FIG. 2, FIG. 2 is a diagram of example components of a device 200. Device 200 may correspond to user device 102 (e.g., one or more s of user device 102), merchant system 104 (e.g., one or more devices of merchant system 104), payment gateway system 106 (e.g., one or more devices of payment gateway system 106), acquirer system 108 (e.g., one or more devices of acquirer system 108), transaction processing system 110 (e.g., one or more devices of transaction processing system 110), and/or issuer system 112 (e.g., one or more devices of issuer system 112). In some non-limiting embodiments, user device 102, merchant system 104, payment gateway system 106, acquirer system 108, transaction processing system 110, and/or issuer system 112 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and firmware. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like) that can be programmed to perform a function. Memory 206 may include random access memory (RAM), read only memory (ROM), and/or another type of dynamic or static storage memory (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a biometric sensor, and/or the like). Additionally, or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a separate receiver and transmitter, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
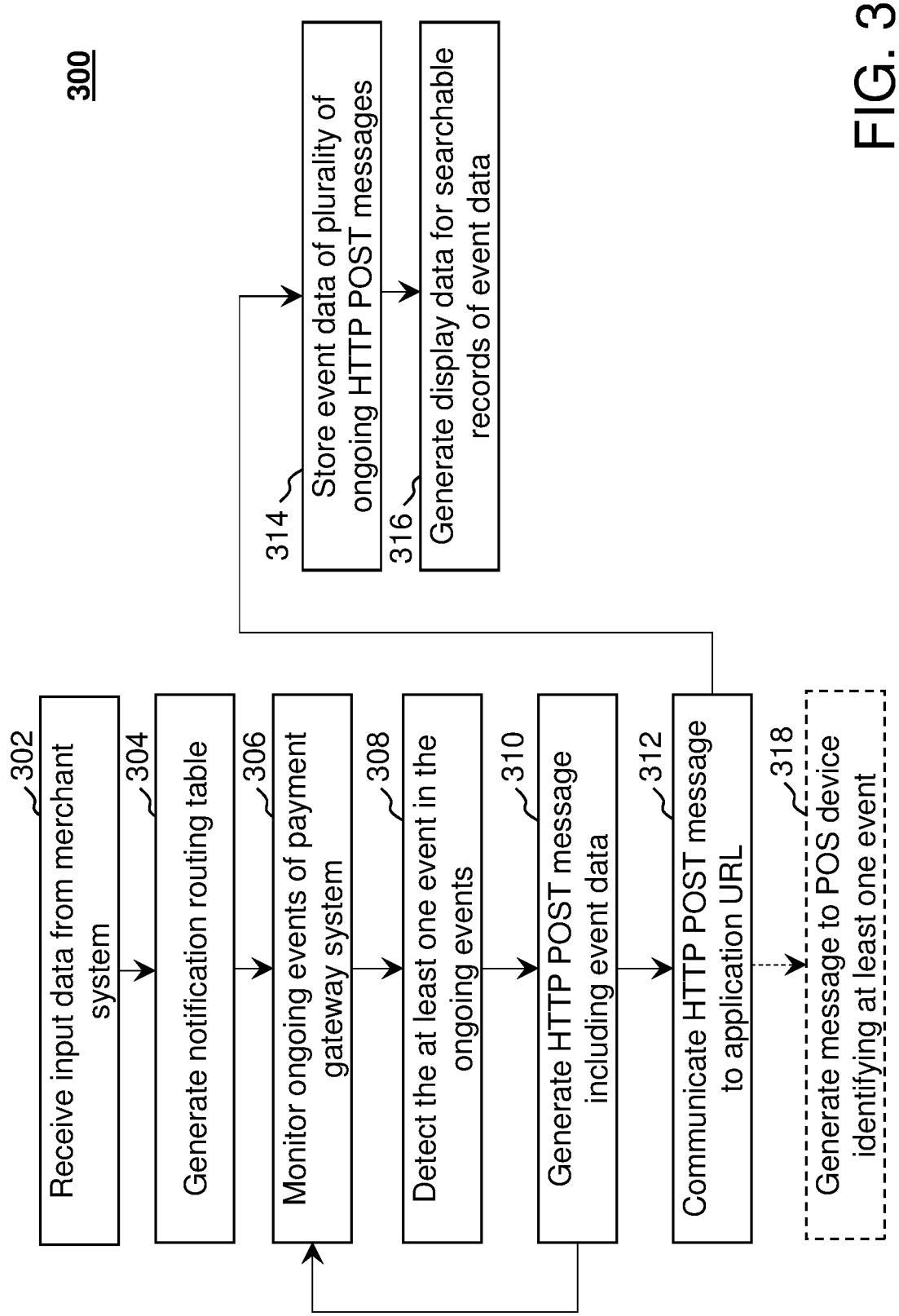
FIG. 3 is a process diagram of one embodiment or aspect of a system and method for real-time payment gateway event monitoring.

Referring now to FIG. 3, FIG. 3 is a flow diagram of a non-limiting embodiment of a process 300 for monitoring payment gateway events in real-time. In some non-limiting embodiments or aspects, one or more steps of process 300 may be performed (e.g., completely, partially, and/or the like) by payment gateway system 106 (e.g., by one or more computing devices of payment gateway system 106 such as, for example, one or more server computers of payment gateway system 106). In some non-limiting embodiments or aspects, one or more of the steps of process 300 may be performed (e.g., completely, partially, and/or the like) by another device or group of devices separate from and/or including payment gateway system 106 such as user device 102, merchant system 104, acquirer system 108, transaction processing system 110, and/or issuer system 112.

As shown in FIG. 3, at step 302, process 300 includes at least one processor of a payment gateway system receiving input data from one or more merchant systems. The input data includes one or more application URLs, each associated with a merchant control interface. The merchant control interface is implemented with a web socket that is programmed and/or configured to persistently listen for HTTP callbacks (e.g., HTTP POST messages). The HTTP callback may be in the form of a webhook. As used herein, the term "webhook" refers to one or more electronic messages communicated from a web application (e.g., a webpage, a web-based client-side application, a web-based server-side application, etc.). A "webhook" message may include a message body (e.g., a payload) and be addressed to a specified URL (e.g., an application URL). In some examples, a webhook message may be automatically generated and communicated to the specified URL in response to a computing device detecting an event and may be configured to cause the system associated with the specified URL to perform one or more actions in response to receiving the message. A webhook may POST data in the form of JSON or XML. The input data also includes one or more identifiers of events of a payment gateway system that are predetermined to trigger notifications to the merchant control interface. For example, an event may be a transaction event, a fraud detection event, a transaction event satisfying a parameter (e.g., a threshold transaction value, a transaction time, a transaction type, etc.), and/or the like. When such events are detected by the payment gateway system, the payment gateway system may trigger (e.g., automatically cause) HTTP POST messages to be communicated to application URLs associated with said event.

In step 304, at least one processor of the payment gateway system may generate a notification routing table (e.g., a table of event data objects stored in relation to application URLs that is used to route triggered notifications) based on the input data. The notification routing table may include one or more application URLs, each associated with one or more events. For example, a given application URL may be associated with a number of parameter-based transaction events. The notification routing table may be stored in a database associated with the payment gateway system.

In step 306, at least one processor of the payment gateway system may monitor ongoing events of the payment gateway system associated with ongoing transaction messages communicated from at least one point-of-sale (POS) device to the payment gateway system. For example, the payment gateway system may continuously monitor ongoing transaction events, associated with authorization request messages communicated from one or more POS devices. Monitoring may include comparing each event of the ongoing events to the events stored in the notification routing table, such that if an event of the ongoing events matches an event in the notification routing table, a notification (e.g., HTTP POST message) is generated and communicated to an associated application URL (e.g., associated with a merchant control interface and being monitored by a web socket) stored in the notification routing table. The ongoing events may include authorization request messages associated with transactions to be completed between a payment device and a POS device. The at least one event identified in the input data may be the detection of a fraudulent authorization request message (e.g., determined by a fraud monitoring server of the payment gateway system and/or a transaction processing system). In such an instance, the HTTP POST message may be configured to further automatically cause the merchant system, in response to receiving the HTTP POST message at the application URL (e.g., associated with a merchant control interface), to execute a fraud mitigation process (e.g., disabling one or more transaction accounts and/or payment devices, notifying one or more payment device holders, modifying a threshold for denying potentially fraudulent transactions, declining future transactions, and/or the like).

In step 308, at least one processor of the payment gateway system may detect the at least one event, received in the input data, from the ongoing events that the payment gateway system is monitoring. In response to the detection of the at least one event, in step 310, at least one processor of the payment gateway system may generate one or more HTTP POST messages that include event data of the at least one event. Step 310 may be executed immediately after step 308 (e.g., triggered directly subsequent), so as to reduce the delay between event detection and merchant notification. Event data for a transaction event may include, but is not limited to, transaction time, transaction value, payment device holder identifier, payment device identifier, transaction type, and/or the like. Generation of the HTTP POST message may be based on the notification routing table (e.g., based on associated events and application URLs). After generation, in step 312, at least one processor of the payment gateway system may communicate the one or more HTTP POST messages to application URLs, such as those associated with the detected event in the notification routing table. Communication of the HTTP POST message may be based on the notification routing table (e.g., directed to an application URL associated in the table with an event that was detected). The HTTP POST messages may be configured to cause a merchant control interface (e.g., running a web application) associated with a given application URL to display the event data in at least one chart for visual representation of the event data. The HTTP POST message may be configured to cause the merchant system to generate, in step 318, a message to one or more POS devices associated with a triggering transaction event, immediately after (e.g., directly subsequent to) detecting the HTTP POST message. For example, the message may be based on the type of event detected, such as, but not limited to: a confirmation of receipt of payment in response to detection of an authorization request message, an alert of fraud in response to detection of a fraudulent transaction request, and/or the like. The event data may be stored in a database associated with the payment gateway system and/or merchant system before being displayed in the merchant control interface.

The one or more events of the input data may include one or more recurring events (e.g., repeated transactions). The process 300 may include continually monitoring, by at least one processor of the payment gateway system in step 306, the ongoing events to generate a plurality of HTTP POST messages, in step 310, triggered in response to the one or more recurring events. Each HTTP POST message may be associated with an instance of the one or more recurring event. In step 314, at least one processor of the payment gateway system may store, in a database, event data associated with the plurality of HTTP POST messages triggered from the one or more recurring events. In step 316, at least one processor of the payment gateway system may generate display data configured to cause the merchant control interface to display searchable records (e.g., tables, charts, lists, etc.) including the event data of the plurality of HTTP POST messages. Step 316 may be performed automatically in response to a request received from a merchant control interface of a merchant system.

With further reference to the foregoing figures, in non-limiting embodiments or aspects, described systems may be implemented using a Node.js application. A number of Node Package Manger (NPM) packages may be combined to execute back-end processing. The Express web application framework may be employed to define a routing table (e.g., the notification routing table) which may be used to perform different actions based on HTTP method and URL. Socket.io may be used to initiate one or more web sockets for monitoring application URLs. Such web sockets enable real-time, persistent, bi-directional communication between web clients and servers. Real time event occurrence can be displayed to the user when an endpoint (e.g., application URL associated with a web application of a merchant control interface, configured with a web socket to monitor for communications) receives a HTTP POST message. The web socket may emit a message when receiving a notification from the sender of a HTTP POST message, passing information to a front-end platform, such as a merchant control interface, a POS device, and/or the like. LokiJS may be employed for storing data persistently for plotting charts from the stored data. Chart.js may be employed to produce salient charts of stored data. The merchant control interface may be implemented using HTML and JavaScript files.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method comprising:
   receiving, with at least one processor, input data from a merchant system comprising (i) an application URL associated with a merchant control interface having a web socket programmed and/or configured to persistently listen for HTTP POST messages, and (ii) an identifier of at least one event of a payment gateway system, the at least one event predetermined to trigger notifications to the merchant control interface;
   monitoring, with at least one processor, ongoing events of the payment gateway system associated with ongoing transaction messages communicated from at least one point-of-sale (POS) device to the payment gateway system;
   detecting, with at least one processor, the at least one event in the ongoing events; and
   in response to detection of the at least one event:
      generating, with at least one processor, at least one HTTP POST message comprising event data of the at least one event; and
      communicating, with at least one processor, the at least one HTTP POST message to the application URL to cause the merchant control interface to display the event data in at least one chart for visual representation of the event data.

2. The computer-implemented method of claim 1, further comprising generating a notification routing table based on the input data, the notification routing table comprising a plurality of application URLs each associated with one or more events, wherein the at least one HTTP POST message is generated based on the notification routing table and communicated to the application URL based on an association of the application URL with the identifier of the at least one event in the notification routing table.

3. The computer-implemented method of claim 1, wherein the at least one event comprises at least one recurring event, the method further comprising continually monitoring, with at least one processor, the ongoing events to generate a plurality of HTTP POST messages triggered from the at least one recurring event, wherein each HTTP POST message of the plurality of HTTP POST messages is associated with an instance of the at least one recurring event.

4. The computer-implemented method of claim 3, further comprising:
   storing, with at least one processor in a database, additional event data associated with the plurality of HTTP POST messages triggered from the at least one recurring event; and
   generating, with at least one processor, display data configured to cause the merchant control interface to display searchable records comprising the additional event data.

5. The computer-implemented method of claim 1, wherein the ongoing events comprise authorization request messages, the at least one event comprises detection of a fraudulent authorization request message, and the at least one HTTP POST message comprises a categorization of the at least one event as fraudulent, the HTTP POST message further configured to cause the merchant system to execute a fraud mitigation process.

6. The computer-implemented method of claim 1, wherein the at least one HTTP POST message is generated and communicated to the application URL immediately after detection of the at least one event.

7. The computer-implemented method of claim 6, wherein the at least one HTTP POST message is further configured to cause the web socket of the merchant control interface to generate a message to the at least one POS device identifying the at least one event immediately after detecting the HTTP POST message.

8. A system comprising at least one server computer including at least one processor, the at least one server computer programmed and/or configured to:
   receive input data from a merchant system comprising (i) an application URL associated with a merchant control interface having a web socket programmed and/or configured to persistently listen for HTTP POST messages, and (ii) an identifier of at least one event of a payment gateway system, the at least one event predetermined to trigger notifications to the merchant control interface;
   monitor ongoing events of the payment gateway system associated with ongoing transaction messages communicated from at least one point-of-sale (POS) device to the payment gateway system;
   detect the at least one event in the ongoing events; and
   in response to detection of the at least one event:
      generate at least one HTTP POST message comprising event data of the at least one event; and
      communicate the at least one HTTP POST message to the application URL to cause the merchant control interface to display the event data in at least one chart for visual representation of the event data.

9. The system of claim 8, wherein the at least one server computer is further programmed and/or configured to generate a notification routing table based on the input data, the notification routing table comprising a plurality of application URLs each associated with one or more events, wherein the at least one HTTP POST message is generated based on the notification routing table and communicated to the application URL based on an association of the application URL with the identifier of the at least one event in the notification routing table.

10. The system of claim 8, wherein the at least one event comprises at least one recurring event, wherein the at least one server computer is further programmed and/or configured to continually monitor the ongoing events to generate a plurality of HTTP POST messages triggered from the at least one recurring event, wherein each HTTP POST message of the plurality of HTTP POST messages is associated with an instance of the at least one recurring event.

11. The system of claim 10, wherein the at least one server computer is further programmed and/or configured to:
store additional event data associated with the plurality of HTTP POST messages triggered from the at least one recurring event; and
generate display data configured to cause the merchant control interface to display searchable records comprising the additional event data.

12. The system of claim 8, wherein the ongoing events comprise authorization request messages, the at least one event comprises detection of a fraudulent authorization request message, and the at least one HTTP POST message comprises a categorization of the at least one event as fraudulent, the HTTP POST message further configured to cause the merchant system to execute a fraud mitigation process.

13. The system of claim 8, wherein the at least one HTTP POST message is generated and communicated to the application URL immediately after detection of the at least one event.

14. The system of claim 13, wherein the at least one HTTP POST message is further configured to cause the web socket of the merchant control interface to generate a message to the at least one POS device identifying the at least one event immediately after detecting the HTTP POST message.

15. A computer program product comprising at least one non-transitory computer-readable medium including program instructions that, when executed by at least one processor, cause the at least one processor to:
receive input data from a merchant system comprising (i) an application URL associated with a merchant control interface having a web socket programmed and/or configured to persistently listen for HTTP POST messages, and (ii) an identifier of at least one event of a payment gateway system, the at least one event predetermined to trigger notifications to the merchant control interface;
monitor ongoing events of the payment gateway system associated with ongoing transaction messages communicated from at least one point-of-sale (POS) device to the payment gateway system;
detect the at least one event in the ongoing events; and
in response to detection of the at least one event:
generate at least one HTTP POST message comprising event data of the at least one event; and
communicate the at least one HTTP POST message to the application URL to cause the merchant control interface to display the event data in at least one chart for visual representation of the event data.

16. The computer program product of claim 15, wherein the program instructions further cause the at least one processor to generate a notification routing table based on the input data, the notification routing table comprising a plurality of application URLs each associated with one or more events, wherein the at least one HTTP POST message is generated based on the notification routing table and communicated to the application URL based on an association of the application URL with the identifier of the at least one event in the notification routing table.

17. The computer program product of claim 15, wherein the at least one event comprises at least one recurring event, wherein the program instructions further cause the at least one processor to continually monitor the ongoing events to generate a plurality of HTTP POST messages triggered from the at least one recurring event, wherein each HTTP POST message of the plurality of HTTP POST messages is associated with an instance of the at least one recurring event.

18. The computer program product of claim 17, wherein the program instructions further cause the at least one processor to:
store additional event data associated with the plurality of HTTP POST messages triggered from the at least one recurring event; and
generate display data configured to cause the merchant control interface to display searchable records comprising the additional event data.

19. The computer program product of claim 15, wherein the ongoing events comprise authorization request messages, the at least one event comprises detection of a fraudulent authorization request message, and the at least one HTTP POST message comprises a categorization of the at least one event as fraudulent, the HTTP POST message further configured to cause the merchant system to execute a fraud mitigation process.

20. The computer program product of claim 15, wherein the at least one HTTP POST message is generated and communicated to the application URL immediately after detection of the at least one event, and wherein the at least one HTTP POST message is further configured to cause the web socket of the merchant control interface to generate a message to the at least one POS device identifying the at least one event immediately after detecting the HTTP POST message.

* * * * *